US011948546B2

(12) United States Patent
Ebenezer et al.

(10) Patent No.: US 11,948,546 B2
(45) Date of Patent: Apr. 2, 2024

(54) FEED-FORWARD ADAPTIVE NOISE-CANCELING WITH DYNAMIC FILTER SELECTION BASED ON CLASSIFYING ACOUSTIC ENVIRONMENT

(71) Applicant: CIRRUS LOGIC INTERNATIONAL SEMICONDUCTOR LTD., Edinburgh (GB)

(72) Inventors: Samuel P. Ebenezer, Gilbert, AZ (US); Rachid Kerkoud, Gilbert, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 105 days.

(21) Appl. No.: 17/858,771

(22) Filed: Jul. 6, 2022

(65) Prior Publication Data

US 2024/0013765 A1 Jan. 11, 2024

(51) Int. Cl.
*G10K 11/178* (2006.01)
*H04R 1/10* (2006.01)

(52) U.S. Cl.
CPC .. *G10K 11/17854* (2018.01); *G10K 11/17823* (2018.01); *G10K 11/17825* (2018.01);
(Continued)

(58) Field of Classification Search
CPC ....... G10K 11/17854; G10K 11/17823; G10K 11/17825; G10K 11/17881;
(Continued)

(56) References Cited

U.S. PATENT DOCUMENTS 8,645,444 B2 2/2014 Clemow et al.
8,718,291 B2 5/2014 Alves et al.
(Continued)

FOREIGN PATENT DOCUMENTS

GB 2455828 A 6/2009

OTHER PUBLICATIONS

U.S. Patent Application: "Active Noise Cancellation System Using Infinite Impulse Response Filtering", U.S. Appl. No. 17/468,990, filed Sep. 8, 2021. (32 pgs. In pdf).
(Continued)

*Primary Examiner* — Paul Kim
(74) *Attorney, Agent, or Firm* — Andrew M. Harris; Mitch Harris, Atty at Law, LLC

(57) ABSTRACT

An adaptive noise-canceling system generates an anti-noise signal from a noise reference signal with a feed-forward filter that filters the noise reference signal to produce the anti-noise signal. The feed-forward filter has a first response controlled by a set of first coefficients. The adaptive noise-canceling system includes a measurement subsystem for measuring a characteristic of an acoustic environment of the adaptive noise-canceling system, a classifier for classifying the characteristic of the acoustic environment by analyzing an output of the measurement subsystem, and a controller that provides the set of first coefficients to the feed-forward filter in conformity with an output of the classifier. The controller may include a look-up table for providing sets of values of the first coefficients to the feed-forward filter in conformity with an indication provided from the classifier and corresponding to a classification of the characteristic of the acoustic environment of the adaptive noise-canceling system.

36 Claims, 9 Drawing Sheets

(52) U.S. Cl.
CPC ..... *G10K 11/17881* (2018.01); *H04R 1/1083* (2013.01); *G10K 2210/1081* (2013.01); *G10K 2210/3026* (2013.01); *G10K 2210/3027* (2013.01); *G10K 2210/3028* (2013.01); *G10K 2210/3044* (2013.01); *H04R 2460/01* (2013.01)

(58) Field of Classification Search
CPC ... G10K 2210/1081; G10K 2210/3026; G10K 2210/3027; G10K 2210/3028; G10K 2210/3044; H04R 1/1083; H04R 2460/01
USPC .......................................................... 381/71.6
See application file for complete search history.

(56) References Cited

U.S. PATENT DOCUMENTS

| | | | |
|---|---|---|---|
| 8,908,877 B2 | 12/2014 | Milani et al. | |
| 9,106,989 B2 | 8/2015 | Li et al. | |
| 9,224,382 B2 | 12/2015 | Clemow | |
| 9,711,130 B2 | 7/2017 | Hendrix et al. | |
| 10,431,198 B2 | 10/2019 | Magrath et al. | |
| 2010/0061564 A1 | 3/2010 | Clemow et al. | |
| 2018/0061391 A1* | 3/2018 | Ibrahim | G10K 11/1783 |
| 2024/0007802 A1* | 1/2024 | Guo | H04R 25/453 |

OTHER PUBLICATIONS

U.S. Patent Application: "Adaptive Noise-Canceling With Dynamic Filter Selection Based on Multiple Noise Sensor Signal Phase Differences", U.S. Appl. No. 17/875,364, filed Jul. 27, 2022. (42 pgs. in pdf).

* cited by examiner

FEED-FORWARD ADAPTIVE NOISE-CANCELING WITH DYNAMIC FILTER SELECTION BASED ON CLASSIFYING ACOUSTIC ENVIRONMENT

BACKGROUND

1. Field of Disclosure

The field of representative embodiments of this disclosure relates to audio signal processing methods and circuits that suppress ambient noise with a feed-forward filter, in which filter selection is made by classifying an acoustic environment of a noise-canceling system in order to adapt the adaptive noise-canceling system.

2. Background

Personal audio devices, including personal communications devices are frequently operated in the vicinity of ambient noise sources, such as room noise, traffic noise, machinery noise, etc. Performance of such devices with respect to intelligibility of voice communications or program audio can be improved by providing noise-canceling using a microphone to measure ambient acoustic events and then using signal processing to insert an anti-noise signal into the output of the device to cancel the ambient acoustic events/noise.

Since the acoustic environment around the personal audio devices may change dramatically, depending on the sources of noise that are present and the position of the device itself, it is generally desirable to adapt the noise canceling to take into account such environmental changes. In particular, for earspeakers, the "fit" of the earspeakers to the user's ears may alter the performance of the noise canceling system significantly. Adaptive noise canceling circuits, in particular those that can adapt to both the ambient noise and the position of the device or fit of earspeakers, can be complex, consume additional power, and may generate undesirable results under certain circumstances, including instabilities due to changes in the acoustic environment. In order to provide effective noise-canceling, the latency of the anti-noise signal with respect to the reference source from the microphone also must be maintained at a minimal delay. Complex filtering and feedback systems typically introduce significant delay and are typically implemented as finite-impulse response (FIR) filters. Infinite-impulse response (IIR) filters have reduced power consumption and complexity, but their design and control is non-trivial and are subject to instabilities with minor variations of coefficients. Therefore, IIR filters are typically not used in ANC implementations.

Therefore, it would be advantageous to provide a low power audio processing system for a personal audio device that effectively cancels ambient noise, while adapting to changes in the acoustic environment of the device, including earspeaker fit and/or device positioning.

SUMMARY

Reduced complexity/power of an adaptive noise-canceling system that adapts to changes in the acoustic environment of a personal audio device may be accomplished in systems and their methods of operation.

The adaptive noise-canceling system generates an anti-noise signal from a noise reference signal with a feed-forward filter that filters the noise reference signal to produce the anti-noise signal. The feed-forward filter has a first response controlled by a set of first coefficients. The adaptive noise-canceling system includes a measurement subsystem for measuring a characteristic of an acoustic environment of the adaptive noise-canceling system, a classifier for classifying the characteristic of the acoustic environment by analyzing an output of the measurement subsystem, and a controller that provides the set of first coefficients to the feed-forward filter in conformity with an output of the classifier. The controller may include a look-up table for providing sets of values of the first coefficients to the feed-forward filter in conformity with an indication provided from the classifier and corresponding to a classification of the characteristic of the acoustic environment of the adaptive noise-canceling system, so that the set of first coefficients is selected from a collection of sets of coefficients.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses adaptive noise-canceling (ANC) systems that generate an anti-noise signal from a noise reference signal with a feed-forward filter that filters the noise reference signal to produce the anti-noise signal. The feed-forward filter may have a first response controlled by a set of first coefficients. The adaptive noise-canceling system may include a measurement subsystem for measuring a characteristic of an acoustic environment of the adaptive noise-canceling system, a classifier for classifying the characteristic of the acoustic environment by analyzing an output of the measurement subsystem, and a controller that provides the set of first coefficients to the feed-forward filter in conformity with an output of the classifier. The controller may include a look-up table for providing sets of values of the first coefficients to the feed-forward filter in conformity with an indication provided from the classifier and corresponding to a classification of the characteristic of the acoustic environment of the adaptive noise-canceling system, so that the set of first coefficients is selected from a collection of sets of coefficients. The measurement subsystem may be an adaptive filter that models a secondary acoustic path extending from the output acoustic transducer of the ANC system through an error microphone that measures the output of the output acoustic transducer and ambient noise proximate the output acoustic transducer, so that the classifier classifies the acoustic environment of a user of a personal audio device, such as a mobile telephone, which is generally determined by the head shape and characteristics of one or more ear canals of the user, as well as the fit of earphones or position of a mobile telephone with respect to the ear of the user.

Figure 1:
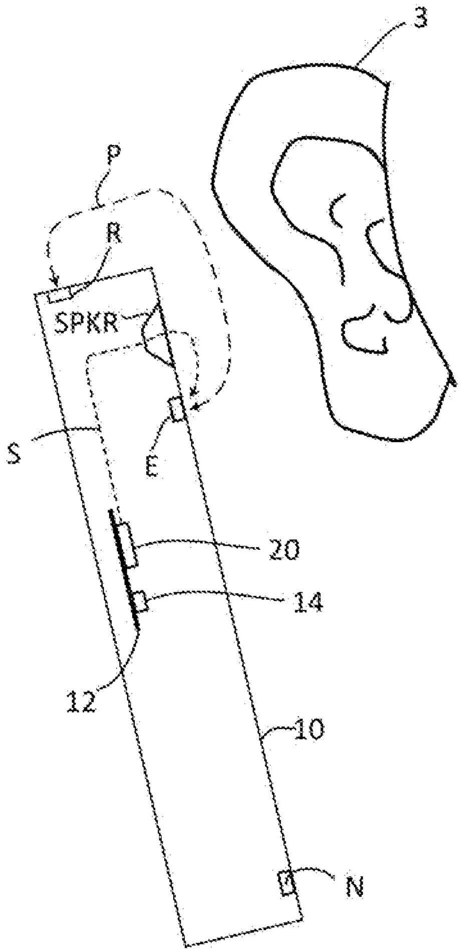
FIG. 1 is an illustration of an example wireless telephone 10, which is an example of a personal audio device in which the techniques disclosed herein may be implemented, in accordance with an embodiment of the disclosure.

Referring now to FIG. 1, an illustration of an example wireless telephone 10 is shown, which is an example of a personal audio device in which the techniques disclosed herein may be implemented, in accordance with an embodiment of the disclosure. Wireless telephone 10 includes a transducer such as speaker SPKR that reproduces distant speech received by wireless telephone 10, along with other local audio events such as ringtones, stored audio program material, near-end speech (i.e., the speech of the user of wireless telephone 10), sources from web-pages or other network communications received by wireless telephone 10 and audio indications such as battery low and other system event notifications. A near-speech microphone N is provided to capture near-end speech, which is transmitted from wireless telephone 10 to the other conversation participant(s).

Wireless telephone 10 includes adaptive noise canceling (ANC) circuits and systems that inject an anti-noise signal into speaker SPKR to improve intelligibility of the distant speech and other audio reproduced by speaker SPKR. A reference microphone R may be provided for measuring the ambient acoustic environment and positioned away from a typical position of a user's mouth, so that the near-end speech is minimized in the signal produced by reference microphone R. A third microphone, error microphone E, may be provided in order to further improve ANC operation by providing a measure of the ambient audio combined with the audio reproduced by speaker SPKR close to an ear 3 of the user, when wireless telephone 10 is in proximity to ear 3. A circuit 12 within wireless telephone 10 may include an audio CODEC integrated circuit 20 that receives the signals from reference microphone R, near-speech microphone NS, and error microphone E and interfaces with other integrated circuits such as an RF integrated circuit 14 containing the wireless telephone transceiver. In some embodiments of the disclosure, the circuits and techniques disclosed herein may be incorporated in a single integrated circuit that contains control circuits and other functionality for implementing the entirety of the personal audio device, such as an MP3 player-on-a-chip integrated circuit. In the depicted embodiments and other embodiments, the circuits and techniques disclosed herein may be implemented partially or fully in software and/or firmware embodied in computer-readable storage media and executable by a processor circuit or other processing device such as a microcontroller.

In general, the ANC techniques disclosed herein measure ambient acoustic events and noise (as opposed to the output of speaker SPKR and/or the near-end speech) impinging on error microphone E and/or reference microphone R. The ANC processing circuits of illustrated wireless telephone 10 generate an anti-noise signal generated from the output of error microphone E and/or reference microphone R to have a characteristic that minimizes the amplitude of the ambient acoustic events present at error microphone E, although continuous and exact estimation of the required anti-noise signal is not a requirement of the disclosure. In particular, compensation for an acoustic path P that extends from reference microphone R to error microphone E may be performed adaptively and/or may be selected as a feed-forward filter response that is adapted to a particular user by measuring an acoustic environment of wireless telephone 10 that gives an indication of a "class" of user characteristics which permits selection of an appropriate response for the feed-forward filter. In feed-forward ANC systems, the feed-forward filter compensates for acoustic path P, combined with removing effects of an electro-acoustic path S that represents the response of the audio output circuits of CODEC IC 20 and the acoustic/electric transfer function of speaker SPKR including the coupling between speaker SPKR and error microphone E in the particular acoustic environment, i.e., including the fit and head/ear characteristics of the user. Electro-acoustic path S is affected by the proximity and structure of ear 5 and other physical objects and human head structures that may be in proximity to wireless telephone 10, in particular, when wireless telephone 10 is not firmly pressed to ear 5. While the illustrated wireless telephone 10 includes a two microphone ANC system with a third near-speech microphone N, other systems that do not include separate error and reference microphones may implement the above-described techniques. Alternatively, near-speech microphone N may be used to perform the function of the reference microphone R in the above-described system. Also, in personal audio devices designed only for audio playback, near-speech microphone N will generally not be included, and the near-speech signal paths in the circuits described in further detail below may be omitted without changing the scope of the disclosure.

The techniques disclosed herein may also be applied in purely noise-canceling systems that do not reproduce a playback signal or conversation using the output transducer, i.e., those systems that only reproduce an anti-noise signal, as long as the measurement of user characteristics may be obtained for classification, e.g., using a microphone and test intermittent signal, or using other sensing techniques for performing the measurement of ear fit and/or ear/head characteristics. As used in this disclosure, the terms "headphone" and "speaker" refer to any acoustic transducer intended to be mechanically held in place proximate to a user's ear canal and include, without limitation, earphones, earbuds, and other similar devices. As more specific examples, "earbuds" or "headphones" may refer to intra-concha earphones, supra-concha earphones and supra-aural earphones. Further, the techniques disclosed herein are applicable to other forms of acoustic noise canceling, and the term "transducer" includes headphone or speaker type transducers, but also other vibration generators such as piezo-electric transducers, magnetic vibrators such as motors, and the like. The term "sensor" includes microphones, but also includes vibration sensors such as piezoelectric films, and the like.

Figure 2:
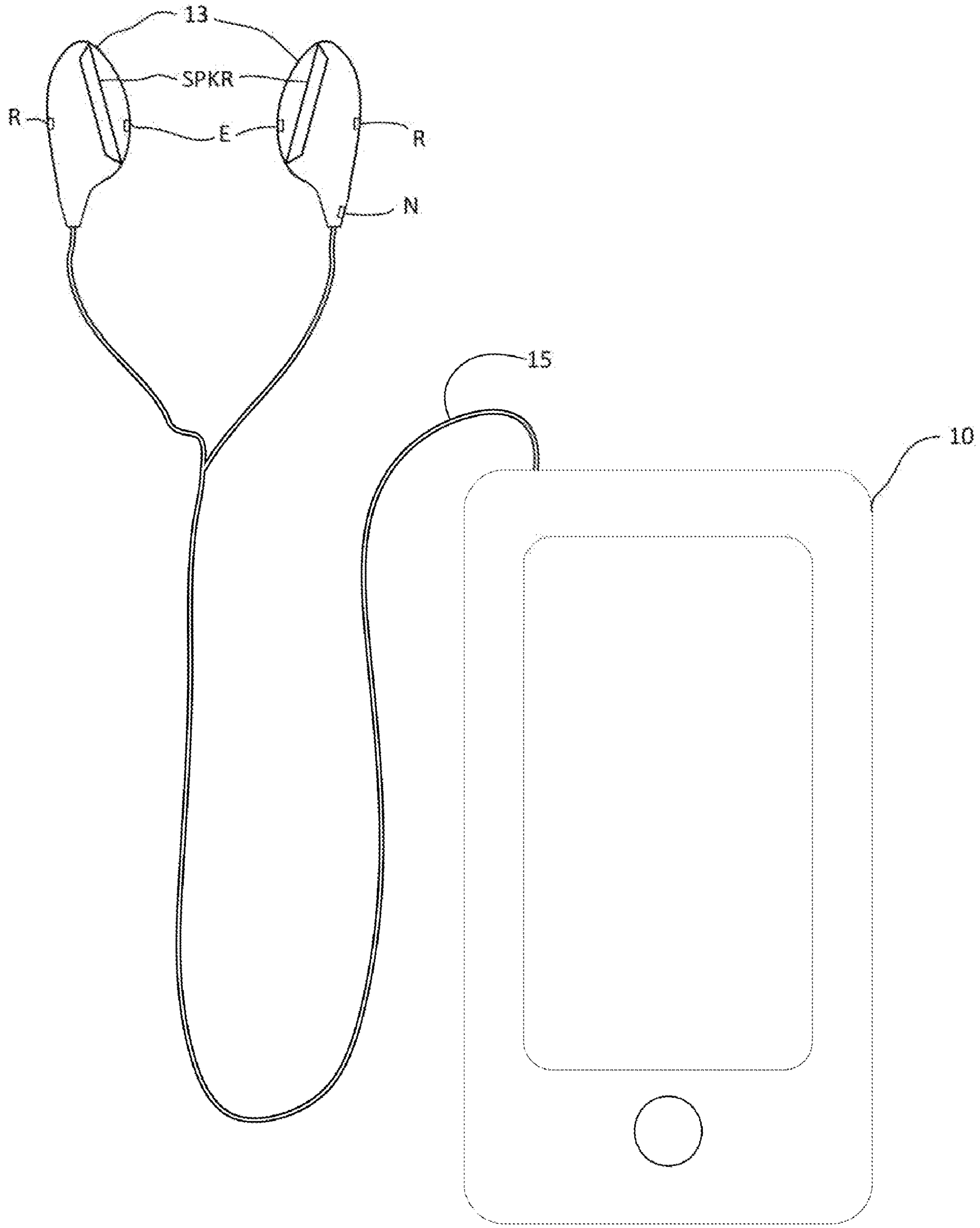
FIG. 2 is an illustration of a wireless telephone 10 coupled to a pair of earphones 13, which is an example of a personal audio system in which the techniques disclosed herein may be implemented, in accordance with an embodiment of the disclosure.

Referring now to FIG. 2, another example wireless telephone configuration in which the techniques disclosed herein may be implemented is shown, in accordance with an embodiment of the disclosure. FIG. 2 shows wireless telephone 10 and a pair of earphones 13, which may be attached to, or inserted in, a corresponding ear of a listener. Illustrated wireless telephone 10 is an example of a device in which the techniques herein may be employed, but it is understood that not all of the elements or configurations illustrated in wireless telephone 10, or in the circuits depicted in subsequent illustrations, are required. Wireless telephone 10 is connected to earbuds 13 by a wired or wireless connection, e.g., a BLUETOOTH™ connection (BLUETOOTH is a trademark of Bluetooth SIG, Inc.). A wired connection is additionally illustrated, including a cable 15. Earbuds 13 may each have a corresponding transducer, such as speaker SPKR, which reproduces source audio that may include distant speech received from wireless telephone 10, ringtones, stored audio program material, and injection of near-end speech (i.e., the speech of the user of wireless telephone 10) as sidetone information. The source audio may also include any other audio that wireless telephone 10 is required to reproduce, such as source audio from web-pages or other network communications received by wireless telephone 10, and audio indications such as battery low and other system event notifications. Reference microphones R may be provided on a surface of the housing of respective earbuds 13 for measuring noise in the ambient acoustic environment. Another pair of microphones, error microphones E, may be provided in order measure the above-described acoustic environment corresponding to secondary path S, by providing a measure of the ambient audio combined with the audio reproduced by respective speakers SPKR close to corresponding ear, when earphones 13 are inserted in the outer portion of the users ear. As in wireless telephone 10 of FIG. 1, wireless telephone 10 includes adaptive noise canceling (ANC) circuits and systems that inject an anti-noise signal into speakers SPKR to improve intelligibility of the distant speech and other audio reproduced by speakers SPKR. In the depicted example, an ANC circuit within wireless telephone 10 receives the signals from reference microphones R and error microphones E. Alternatively, all or a portion of the ANC circuits disclosed herein may be incorporated within earbuds 13. For example, each of earbuds 13 may constitute a stand-alone acoustic noise canceler including a separate ANC circuit. Near-speech microphone NS may be provided on the outer surface of a housing of one of earphones 13, on a boom affixed to one of earphones 13, or on a com-box pendant located between wireless telephone 10 and either or both of earphones 13 along cable 15.

Figure 3:
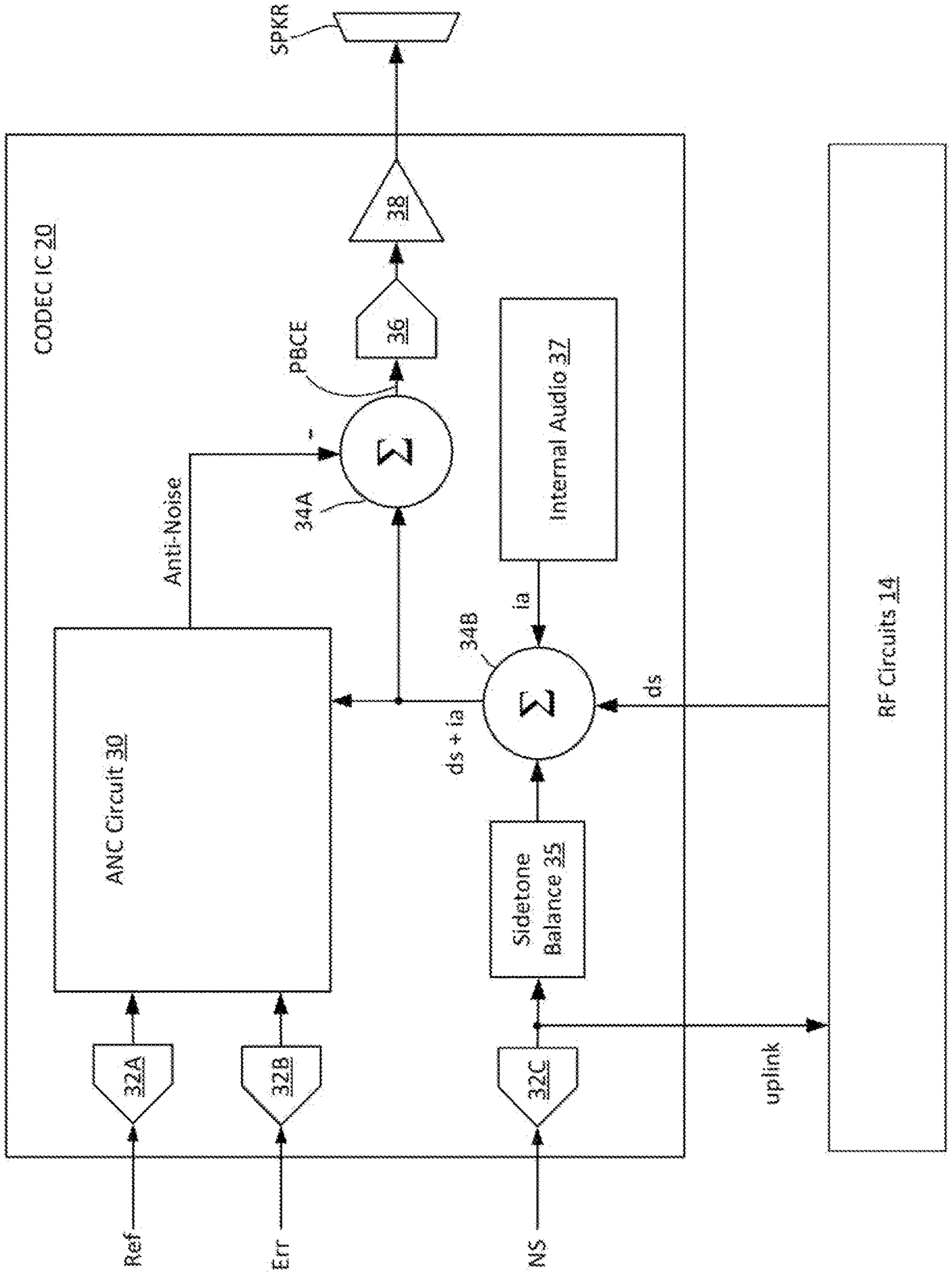
FIG. 3 is a block diagram illustrating example circuit blocks within example wireless telephone of FIG. 1 and FIG. 2, in accordance with an embodiment of the disclosure.

Referring now to FIG. 3, a block diagram illustrating example circuit blocks within example wireless telephone of FIG. 1 and FIG. 2 is shown, in accordance with an embodiment of the disclosure. Audio CODEC integrated circuit (IC) 20 receives a reference microphone signal Ref and an analog-to-digital converter (ADC) 32A converts reference microphone signal Ref to a digital representation provided to an ANC circuit 30, which generates the anti-noise signal Anti-Noise. Audio CODEC integrated circuit 20 also includes an ADC 32B for receiving an error microphone signal Err from error microphone E and generating a digital representation of the error microphone signal, and an ADC 32C for receiving near-speech microphone signal NS from near-speech microphone N and generating a digital representation of near-speech microphone signal NS. Audio CODEC integrated circuit 20 generates an output for driving speaker SPKR from an amplifier 38, which amplifies the output of a digital-to-analog converter (DAC) 36 that receives the output of a combiner 34A. Combiner 34A combines anti-noise signal Anti-Noise with a combined playback audio signal ds+ia received from another combiner 34B that combines an internal audio signal ia received from internal audio sources 37 with a downlink audio signal ds received from RF (Radio Frequency) circuits block 14 and a sidetone signal received from a sidetone balancing circuit 35. Anti-noise signal anti-noise is generated by ANC circuit 30 with the same polarity as the noise in error microphone signal err and reference microphone signal ref and is therefore subtracted from the combined playback audio ds+ia by combiner 34A. Sidetone balancing circuit 35 receives the near-speech signal NS representation from ADC 32C and performs equalization, including gain adjustment to inject an appropriate amount of near speech signal NS across a frequency range expected for speech, so that the user of wireless telephone 10 hears their own voice in proper relation to downlink speech ds. The near speech signal NS representation from ADC 32C is also provided to RF circuits block 14 as an uplink audio signal uplink for transmission to a call destination endpoint.

Figure 4:
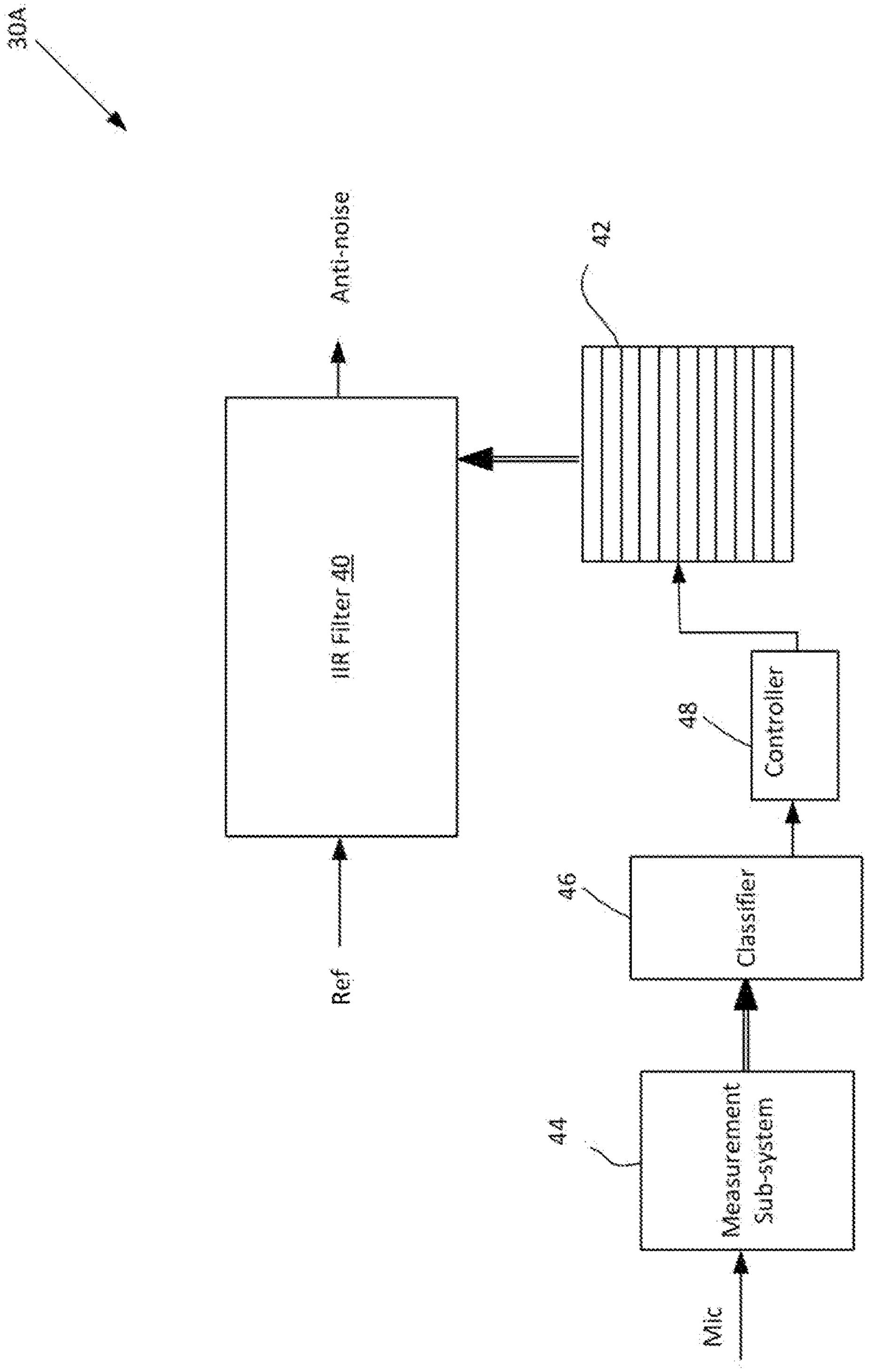
FIG. 4 is a block diagram illustrating an example adaptive noise canceling (ANC) circuit 30A that may be used to implement ANC circuit 30 of FIG. 3, in accordance with an embodiment of the disclosure.

Referring now to FIG. 4, a block diagram illustrates an example adaptive noise canceling (ANC) circuit 30A that may be used to implement ANC circuit 30 of FIG. 3, in accordance with an embodiment of the disclosure. An infinite-impulse response (IIR) filter 40 receives reference microphone signal Ref and applies a transfer function W(z) to be P(z)/S(z) to generate the anti-noise signal. The coefficients of adaptive filter 40 are selected as a set of coefficients from a W coefficient lookup table 42 by a controller 48 and are selected to reduce components of reference microphone signal ref that are in the audible frequency range for a nominal user that corresponds to the selected set of coefficients. The coefficients are not necessarily typical coefficients of a filter transfer function, but may include selection between different filter topologies, including, for example, selection between sets of custom-designed filters of differing topologies that might be implemented by the physical architecture of IIR filter 40, which may be, for example a reconfigurable digital, analog or hybrid mixed-signal processing block. The selection of a particular set of coefficients selects a particular corresponding frequency response to be applied to reference microphone signal Ref to generate anti-noise signal Anti-Noise for the nominal user, and is performed in response to a classifier 46 that classifies measurements of the acoustic environment of the device provided by a measurement-subsystem 44. The measurement of the acoustic environment may be a measurement of an audio-frequency response of secondary path S, which may be performed by an adaptive filtering system operating at a much lower sample rate than IIR Filter 40, and which may be performed in response to a microphone input Mic. Microphone input Mic may receive input from error microphone E in the above examples, or may include one or more other microphones. The lower sample rate of measurement sub-system 44 does not affect the latency of IIR Filter 40 in performing noise-canceling, and thus provides an example of a low-latency noise-canceling solution that can be performed with reasonable circuit complexity and energy use. While additional adaptation of coefficients of adaptive filter 40 may be performed, the sets of coefficients provided to IIR filter 40 may in some example embodiments, be the only adjustment made to IIR Filter 40, or alternatively, a gain calibration might be applied by a scaler/gain-stage within IIR filter 40 without adapting higher-order coefficients in real-time.

The coefficients in lookup table 42 may be custom-designed, or may be produced by any of the off-line design processes described in co-pending U.S. patent application Ser. No. 17/468,990 filed on Sep. 8, 2021 and entitled "ACTIVE NOISE CANCELLATION SYSTEM USING INFINITE IMPULSE RESPONSE FILTERING", the disclosure of which is incorporated herein by reference. The sets of coefficients represent a reduced set of potential responses selectable for IIR Filter 40, which correspond to nominal users having different head and ear canal characteristics, i.e., to different classes of users, distinguished by those characteristics. As mentioned above, the input to classifier 46 may constitute a representation of a measured secondary acoustic path (S) response, which may be in terms of specific poles and zeros in the response of secondary path S, specific amplitudes and/or phases of the response at particular frequencies of interest, or other information that can specify the nominal user characteristics and phone position or earbud fit, as "features" of the measurement provided by measurement subsystem 44. Classifier 46 further reduces the representation to select the particular nominal user/class that is provided as an input to lookup table 42 to select the response of IIR filter 40, or an initial response in examples that provide for further adaptation of IIR filter 40.

Figure 5A:
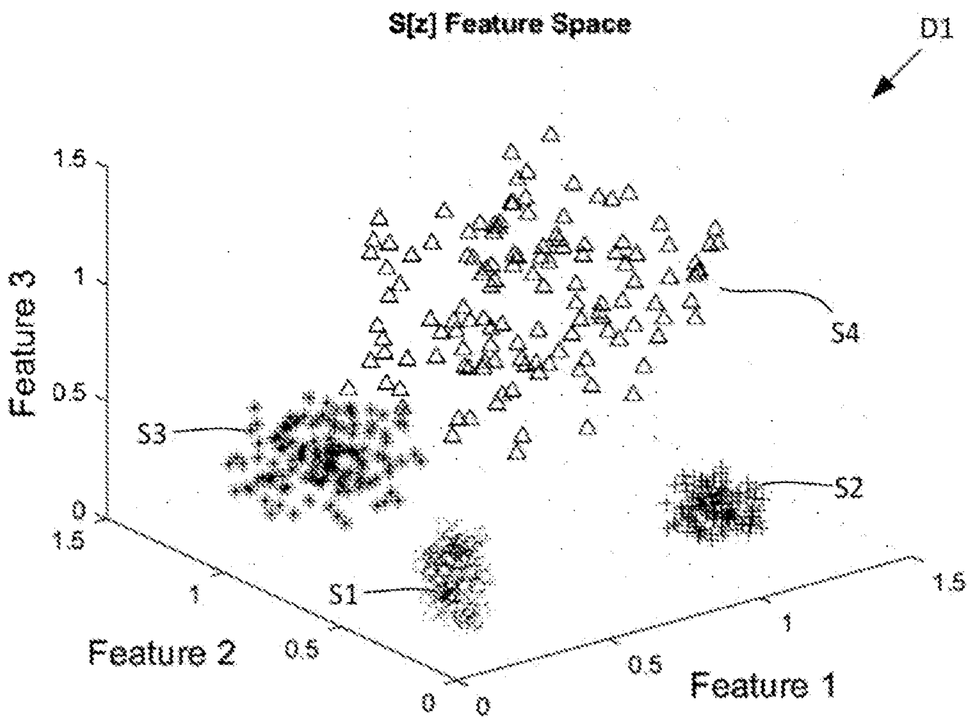
FIGS. 5A-5D are graphs illustrating mapping between measured acoustic environment information and selected filter responses as implemented in example ANC circuit 30A of FIG. 4, in accordance with an embodiment of the disclosure.
Figure 5B:
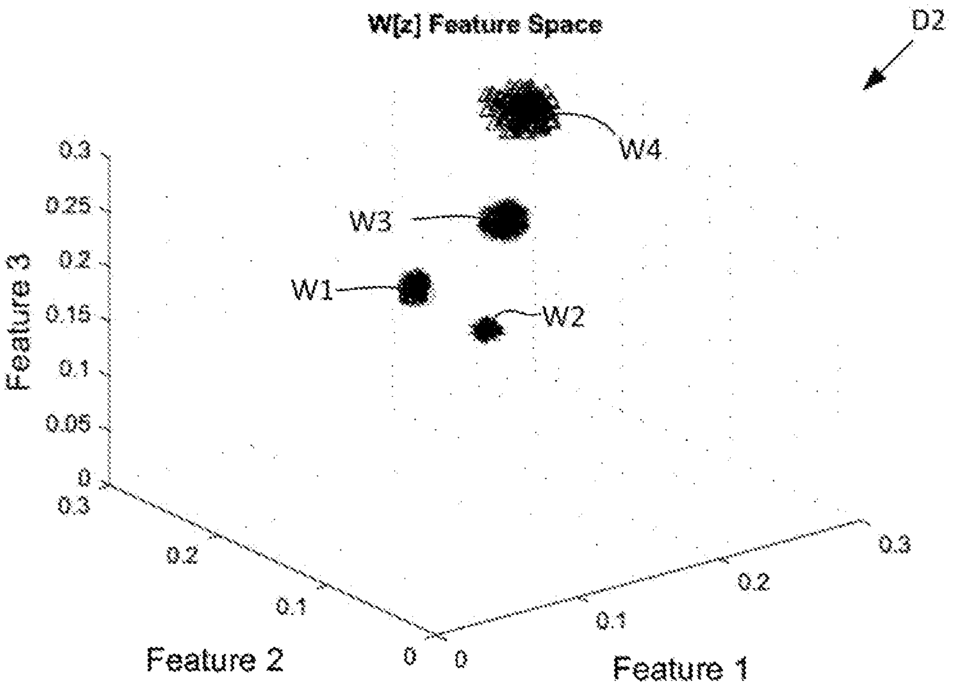
Figure 5C:
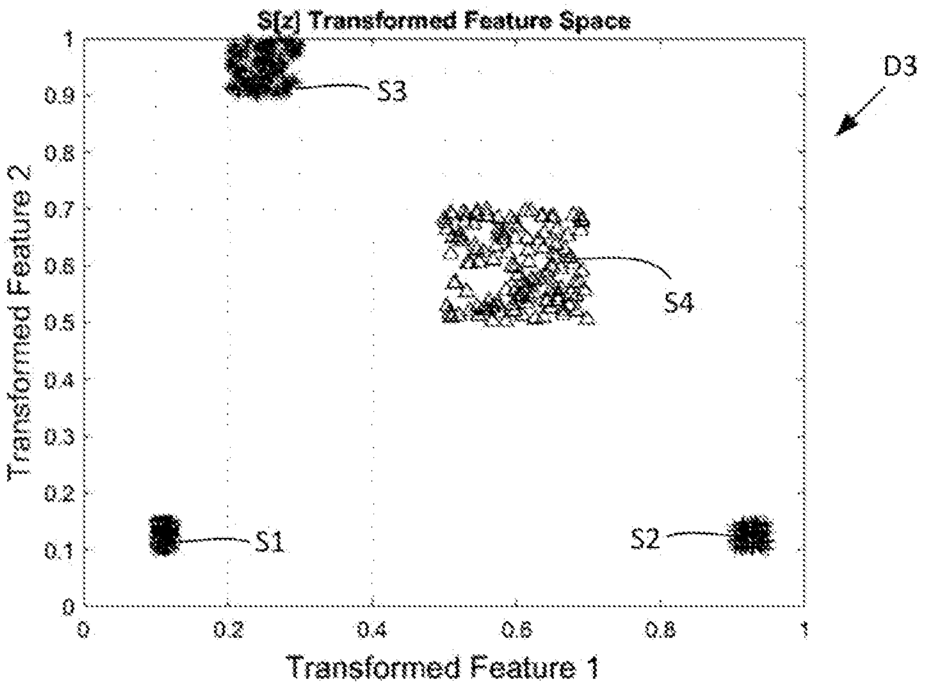
Figure 5D:
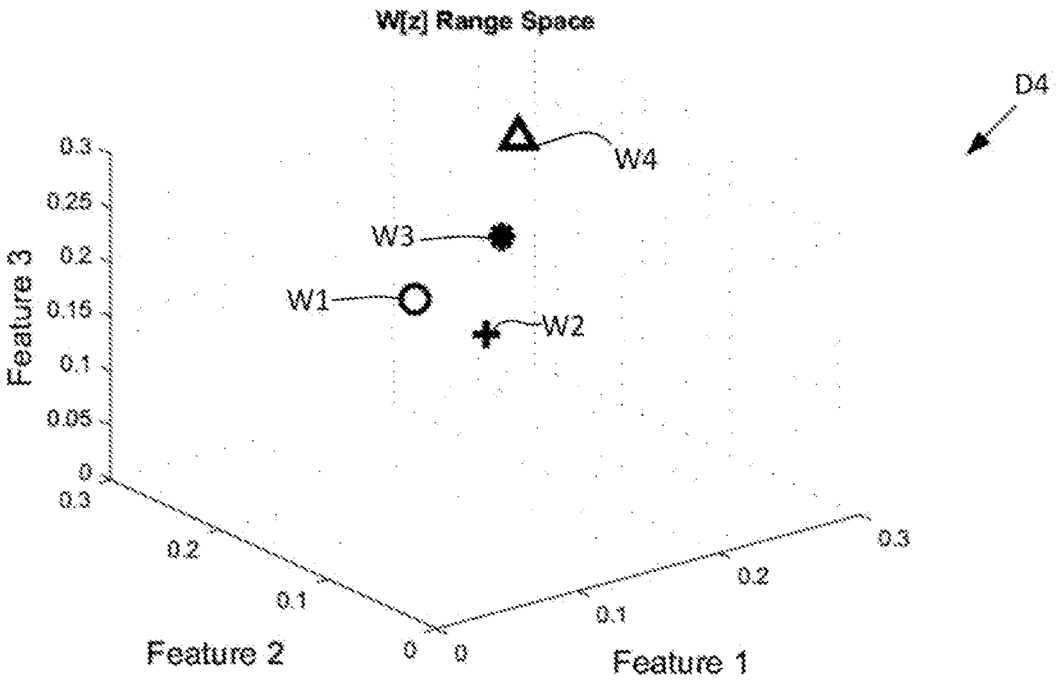

Referring now to FIGS. 5A-5D, graphs illustrating mapping between measured acoustic environment information and selected filter responses as implemented in example ANC circuit 30A of FIG. 4 are shown, in accordance with an embodiment of the disclosure. FIG. 5A shows a three-dimensional (3D) representation of an S(z) feature space graph D1, i.e., the location of various secondary path S responses across multiple user characteristics, e.g., user head shapes/ear canal shapes and phone position/earphone fit by feature for three different features. The data set represented by groups S1, S2, S3 and S4 reveal that the distribution across the features is not uniform, i.e., there is a consistency of groupings by feature value within each group S1-S4, FIG. 5B shows a similar 3D feature space graph D2 of desired filter responses W(z) for IIR filter 40 for the user variations depicted in graph D1 of FIG. 5A, which provides mapping from secondary path response to target filter response for IIR filter 40. Groups S1, S2, S3 and S4 in graph D1 correspond (in numerical order) to groups W1, W2, W3 and W4 in graph D2, which exhibit a closer grouping of W(z) targets relative to the grouping of S path responses, which is advantageous. The mapping of S path responses to W(z) target responses allows for transformation of the measured features, e.g., of the secondary acoustic path S response to a lower-dimensional subspace of parameters. FIG. 5C shows a two-dimensional representation of a transformed S(z) feature space graph D3, i.e., the location of the various secondary path S responses for features Feature 1 and Feature 2 after transformation of the Feature 1 and Feature 2 coordinates to remove dependency on Feature 3. The data set represented by groups S1, S2, S3 and S4 have a more compact consistency of groupings by Feature 1 and Feature 2 within each group S1-S4. FIG. 5D shows the resultant 3D feature space graph D4 of desired filter responses W(z) for IIR filter 40, based on the transformed groups depicted in graph D3 of FIG. 5C, which provides the target filter response for IIR filter 40 for selection based on which group in feature space graph D3 the measured secondary path response S falls within.

Referring again additionally to FIG. 4, classifier 44 receives the output of measurement sub-system 44, which in the instant example may be features describing secondary path response S, as Features 1-3 of graph D1 of FIG. 5A. The feature values are then transformed by classifier 44 to the transformed feature space of graph D3 of FIG. 5C, and the transformed features are used to generate an indicator for look-up of the selected initial response W(z) for IIR filter 40. Thus, while the transformation of the features describing secondary path response S may be performed on-line, the transformation to the selected response W(z) for IIR filter 40 is not required in an on-line operation, as the indication is used to look up the coefficients of the selected W(z) response via lookup table 42. The transformation from the original feature set provided from measurement subsystem may be performed using linear discriminant analysis (LDA), by singular value discriminant analysis (SDA) or another technique that may produce a reduction of the feature set size. While the above examples use a maximum feature set of order three, a larger number of features may be similarly reduced to generate the transformed features used to generate the lookup into the W(z) groups depicted in graph D4 of FIG. 5C, and thus the lookup indication that selects the W(z) initial response. The feature reduction performed by classifier 44 provides a more computationally-efficient system when the set of potentially unique values for secondary path response S is large, since a lesser number of features are required to be stored in memory for similarity comparisons as described below with reference to FIG. 6, i.e., the size of memory 53 in the example system depicted in FIG. 6. The amount of entries/memory required may vary dependent on the design of a headset and other acoustic factors that contribute to secondary path response S.

Figure 6:
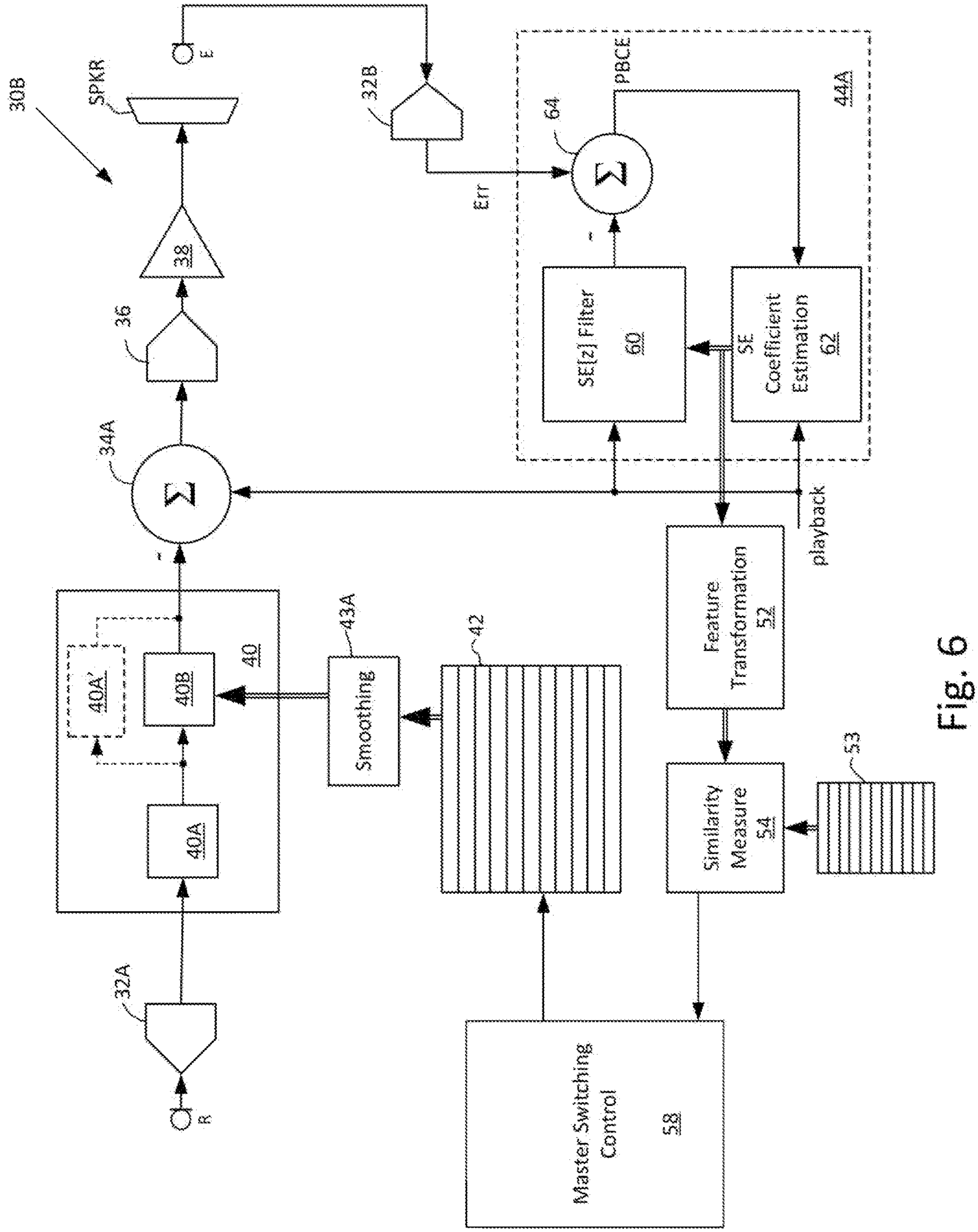
FIG. 6 is a block diagram illustrating another example ANC circuit 30B, in accordance with an embodiment of the disclosure.

Referring now to FIG. 6, a block diagram illustrates another example ANC circuit 30B is shown, in accordance with an embodiment of the disclosure. FIG. 6 includes elements of CODEC IC 20 of FIG. 3 and ANC system 30A of FIG. 4, so only differences between them will be described below. IIR filter 40 as illustrated may contain both a fixed filter section 40A and a filter section 40B having a selectable (variable) response, and fixed filter section 40A may be connected in a serial cascade as shown, or optionally as a parallel stage 40A' as illustrated as an alternative with dashes. A measurement subsystem 44A is illustrated as an adaptive filter that estimates secondary path response S, by filtering playback signal playback (ds+ia in FIG. 3) with the secondary path estimate, and removing the resulting playback corrected error signal PBCE from the error microphone signal digital representation provided from ADC 32B. By transforming playback audio playback with the estimate of secondary path response S, the portion of playback audio playback that is removed from error microphone signal Err by combiner 64 should match the expected version of playback audio playback reproduced at error microphone E, since the electrical and acoustical secondary path S is the path taken by playback audio playback to arrive at error microphone E. Combiner 64 combines error microphone signal representation Err and subtracts playback audio signal playback to produce playback corrected error signal PBCE. To implement the above, filter SE(z) 60 has coefficients controlled by a SE[z] coefficient estimation block 62, which updates based on correlated components of playback audio playback, and playback corrected error PBCE. SE[z] coefficient estimation block 62 correlates the actual playback audio playback with the components of playback audio playback that are present in error microphone signal Err. Filter SE[z] 60 is thereby adapted to generate a signal from playback audio playback, that when subtracted from error microphone signal Err, contains the content of error microphone signal Err that is not due to playback audio playback in playback corrected error signal PBCE.

The coefficients provided by SE coefficient estimation block 62 to filter SE[z] 60 are also provided to a feature transformation block 52 that performs the above-described transformation of features that describe secondary path response S, i.e., the SE coefficients, or feature transformation block 52 may first decompose the coefficients into other descriptors such as poles/zeros or a map of amplitude/phase for different frequencies of interest, before transforming the descriptors into a reduced feature space. A similarity measure block 54 compares the transformed features with a set of nominal values stored in a memory 53 and provides the resultant indication to a master switching control block 58, which determines whether the SE path has changed sufficiently to require an update, and if so, provides a new index to lookup table 42 to select a response for IIR filter 40, based on the output of similarity measure block 54, if a similarity score exceeds a threshold value. The update process within master switching control block 58 detects changes in secondary path S by comparing an updated value of SE(z) using the similarity measure. If the updated SE(z) is sufficiently different over a validation time period, then the updated SE(z) is compared to the nominal SE(z) sets stored in memory 53 and if the similarity is low for all of the stored sets, the updated SE(z) is rejected as an invalid estimate and the coefficient set provided from lookup table 42 is not changed. Any similarity measures such as Euclidean distance, dot-product, correlation coefficient, and other similar measures of "fit" can be used to quantify the similarity between any of the transformed elements of the estimated secondary path response and transformed feature vector provided from a priori transformations of secondary path data. A smoothing block 43A smooths the values provided from lookup table 42 as updates are made, to reduce artifacts and instabilities that might otherwise be caused by switching coefficient sets.

Figure 7:
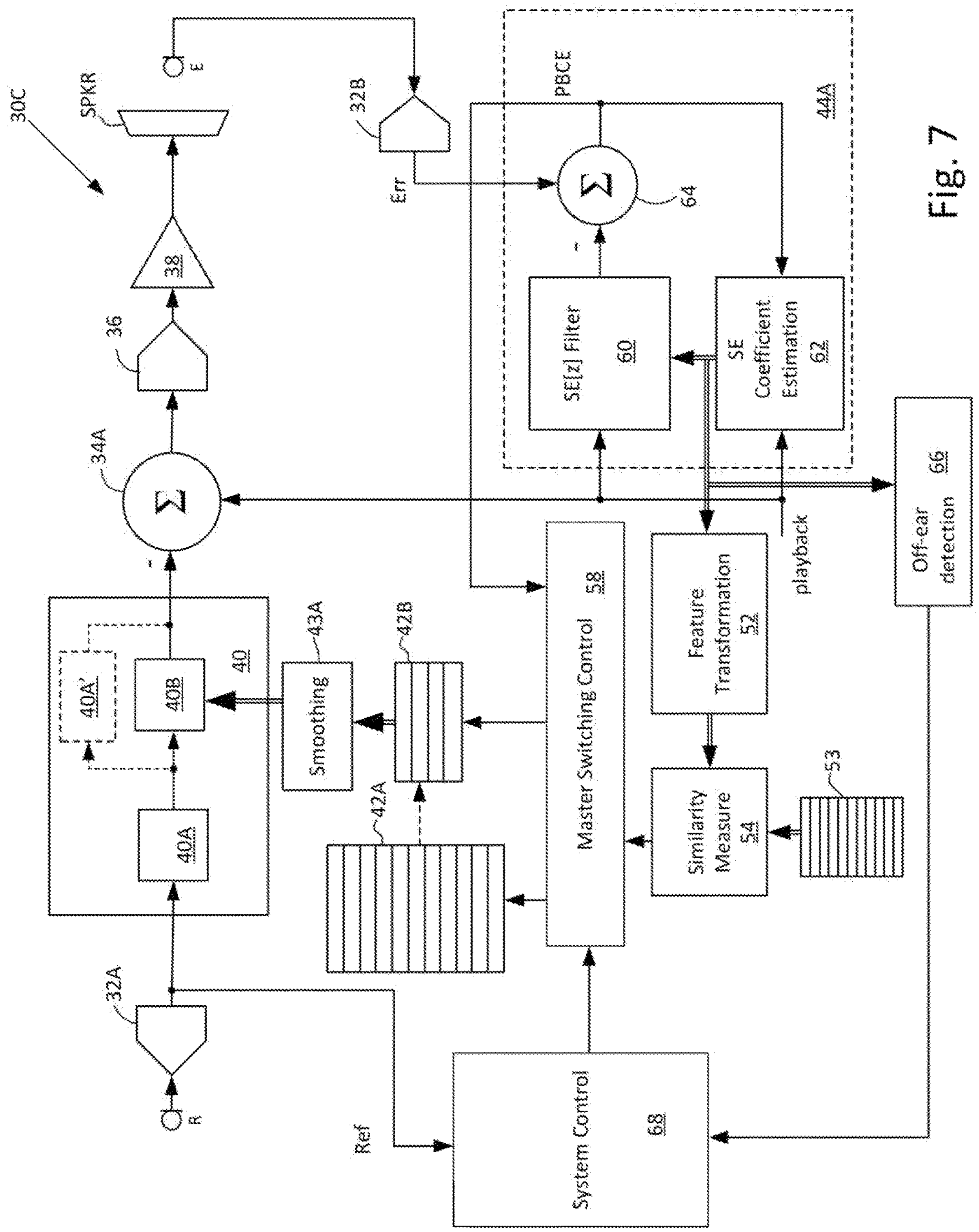
FIG. 7 is a block diagram illustrating another example ANC circuit 30C, in accordance with an embodiment of the disclosure.

Referring now to FIG. 7, a block diagram illustrates another example ANC circuit 30C, in accordance with an embodiment of the disclosure. ANC circuit 30C is similar to ANC circuit 30B of FIG. 6, so only differences between them will be described below. In ANC circuit 30C, two look up tables 42A, 42B are provided with indications from master switching control 58. Lookup table 42A provides a selection of a subset of responses for W(z) based on the information from the transformed SE coefficient information provided by similarity measure block 54. Lookup table 42B then selects the particular response to be provided to IIR filter 40 depending on information derived from reference microphone signal Ref and error microphone signal Err, for example, a threshold can be set on an ANC Gain value derived from the peak or RMS amplitude ratios of the energy of reference microphone signal Ref divided by the energy of error microphone signal Err. An off-ear detection block 66 evaluates the coefficients provided from SE coefficient estimation block 62 to determine whether the adaptation of filter SE[z] 60 is stable and convergent, and signals a system control 68 to indicate whether master switching control 58 should provide any updates in the selection of the W(z) response made via lookup tables 42A, 42B.

Figure 8:
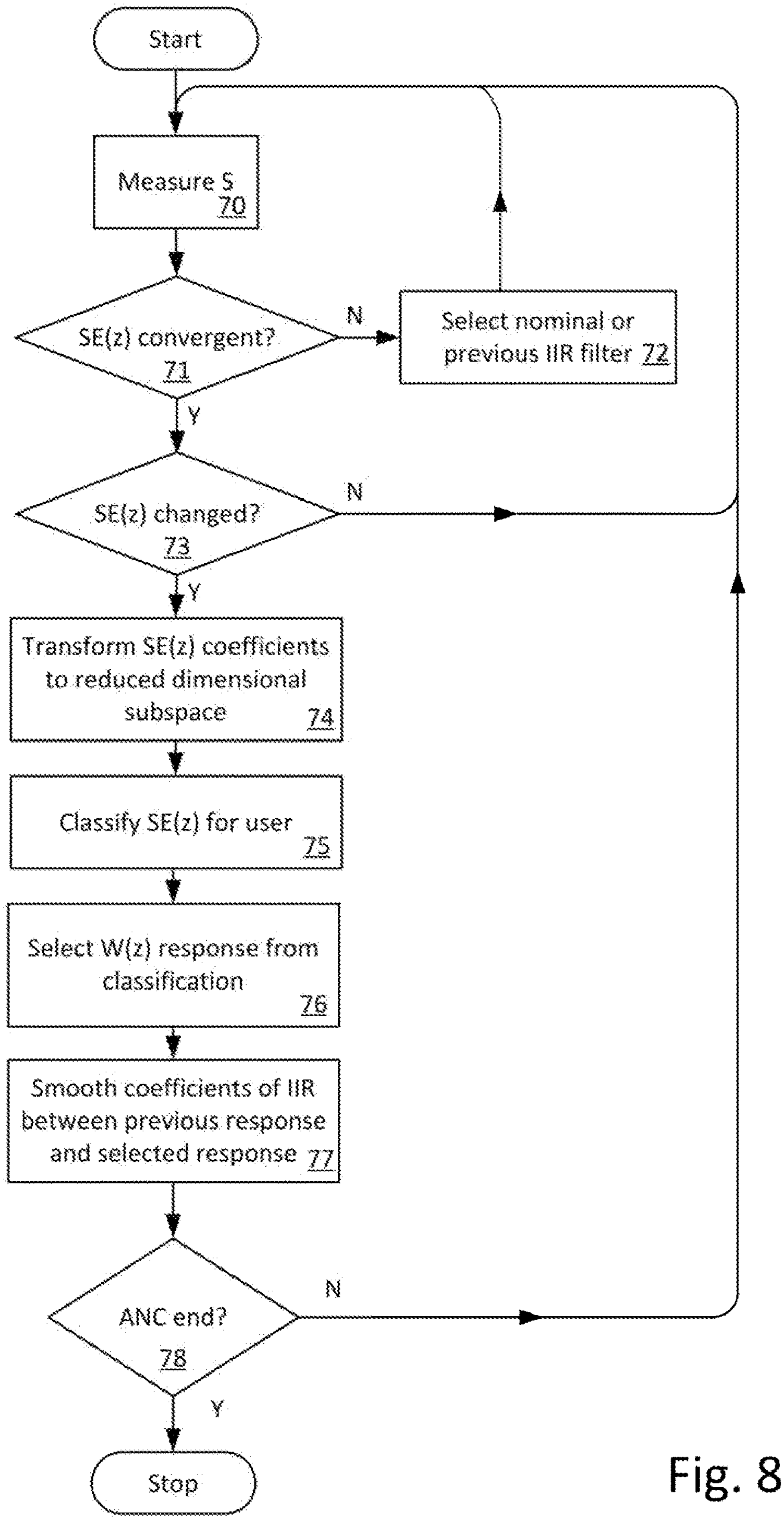
FIG. 8 is a flowchart illustrating operation of an example ANC system, in accordance with an embodiment of the disclosure.

Referring now to FIG. 8, a flowchart illustrates operation of an example ANC systems described above, in accordance with an embodiment of the disclosure. First, the secondary path response S is measured (step 70). If SE(z) is unstable/non-convergent (decision 71), a nominal or previous IIR response may be selected (step 72) and step 70 repeated until a valid SE(z) response is obtained. Once SE(z) is stable/convergent (decision 71), a decision is made as to whether the SE(z) coefficients have changed sufficiently to require an update (decision 73). If the SE(z) coefficients have not changed (decision 73), processing returns to step 70. If the SE(z) coefficients have changed (decision 73), the SE(z) coefficients are transformed to a reduced-dimension feature space (step 74) and SE(z) is then classified for the particular user (step 75). A response for W(z) is selected from the classification (step 76) and the coefficients are smoothed between the previous response and the new (updated) response (step 77). Until ANC operation is ended (decision 78) the process from step 70 to step 77 is repeated.

As mentioned above, portions of the disclosed processes may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium include the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions executed by a digital signal processor (DSP) or other processor that executes computer-readable program instructions. These computer readable program instructions may also be stored in other storage forms as mentioned above and may be downloaded into a non-volatile memory for execution therefrom. However, the collection of instructions stored on media other than system non-volatile memory described above also form a computer program product that is an article of manufacture including instructions which implement aspects of the functions/actions specified in the block diagram block or blocks.

In summary, this disclosure shows and describes adaptive noise-canceling circuits, systems and methods of operation of the systems and circuits that generates an anti-noise signal from a noise reference signal. The adaptive noise-canceling systems may include a feed-forward filter for filtering the noise reference signal to produce the anti-noise signal, and the feed-forward filter may have a first response controlled by a set of first coefficients. The adaptive noise-canceling systems may include a measurement subsystem for measuring a characteristic of an acoustic environment of the adaptive noise-canceling system, a classifier for classifying the characteristic of the acoustic environment of the adaptive noise-canceling system by analyzing an output of the measurement subsystem, and a controller for providing the set of first coefficients to the feed-forward filter in conformity with an output of the classifier.

In some example embodiments, the feed-forward filter may be an infinite impulse response (IIR) filter and the characteristic of the acoustic environment may include a fit of a headset that generates an acoustic output including the anti-noise signal. In some example embodiments, the controller may include a look-up table for providing sets of values of the first coefficients to the feed-forward filter in conformity with an indication provided from the classifier and corresponding to a classification of the characteristic of the acoustic environment of the adaptive noise-canceling system, so that the set of first coefficients is selected from a collection of sets of coefficients. In some example embodiments, the measurement subsystem may include an adaptive filter for measuring the characteristic of the acoustic environment and providing a second response descriptive of the characteristic of the acoustic environment of the system, and the classifier may generate the indication from a classification applied to the second response of the adaptive filter. The classifier may apply a linear discriminant analysis or may apply a singular value discrimination analysis to the response of the adaptive filter to generate the indication provided to the look-up table. In some example embodiments, the controller may further perform smoothing on the first coefficients in response to a change in the output of the classifier causing an update of the first coefficients. In some example embodiments, wherein the feed-forward filter may include a fixed first portion of the feed-forward filter for providing a fixed first partial response and an adaptive second portion of the feed-forward filter responsive to the set of first coefficients, and the fixed portion and the adaptive portion of the feed-forward filter may either be coupled either in series or in parallel between an input that receives the noise reference signal and an output of the adaptive noise-canceling system.

In some example embodiments, the adaptive noise-canceling system may further include a reference input electroacoustic transducer for generating the noise reference signal according to noise present in the acoustic environment of the system and an output electroacoustic transducer for generating an acoustic output including the anti-noise signal from a transducer input signal in the acoustic environment of the adaptive noise-canceling system. The adaptive noise-canceling system may further include an error input electroacoustic transducer for generating an error signal according to the acoustic output from the output electroacoustic transducer and ambient noise, and the adaptive filter may be responsive to the error signal to provide the second response describing the characteristic of the acoustic environment as a second response modeling a secondary acoustic path from the output of the output electroacoustic transducer to the error input electroacoustic transducer. In some example embodiments, the adaptive noise-canceling system may include a convergence evaluator for determining whether or not the second response provided by the adaptive filter is in a stable condition, and the classifier may the second response of the adaptive filter in response to the convergence evaluator determining that the second response provided by the adaptive filter is in a stable condition. In some example embodiments, the classifier may transform the second response modeling the secondary acoustic path to a lower-dimensional subspace of parameters, such that the controller may generate the set of first coefficients from the parameters.

In some example embodiments, the adaptive noise-canceling system may further include a source of audio information for reproduction by the output electroacoustic transducer and a first combiner that combines the program audio with the anti-noise signal to provide the transducer input signal. In some example embodiments, the adaptive noise-canceling system may further include a second combiner that removes the program audio from the output of the adaptive filter to generate the error signal, such that the classifier may classify the second coefficients of the response of the adaptive filter modeling the secondary acoustic path from the acoustic output of the output electroacoustic transducer to an output of the error input electroacoustic transducer and may apply the classification to predict a required first response of the feed-forward filter.

In some example embodiments, the look-up table may include a first look-up table that receives coefficients of the second response descriptive of the acoustic environment of the system as a first indication as an input and provides a second indication corresponding to one of multiple type classifications for the characteristic of the acoustic environment of the system as an output, and a second look-up table that receives the second indication from the first look-up table and provides the first coefficients to the feed-forward filter in conformity with the second indication. In some example embodiments, the adaptive noise-canceling system may include a residual noise evaluator that provides a third indication that indicates an effectiveness of the first response of the feed-forward filter in causing cancelation of ambient noise, and the second indication may be further adjusted in conformity with the third indication to provide the first coefficients to the feed-forward filter. The residual noise evaluator may compare an energy of the error signal to an energy of the noise reference signal to generate the third indication.

It should be understood, especially by those having ordinary skill in the art with the benefit of this disclosure, that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense. Similarly, although this disclosure makes reference to specific embodiments, certain modifications and changes may be made to those embodiments without departing from the scope and coverage of this disclosure. Moreover, any benefits, advantages, or solutions to problems that are described herein with regard to specific embodiments are not intended to be construed as a critical, required, or essential feature or element.

While the disclosure has shown and described particular embodiments of the techniques disclosed herein, it will be understood by those skilled in the art that the foregoing and other changes in form, and details may be made therein without departing from the spirit and scope of the disclosure. For example, the disclosed system may be used to cancel vibration or other non-audio frequency noise.

What is claimed is:

1. An adaptive noise-canceling system for generating an anti-noise signal from a noise reference signal, the adaptive noise-canceling system comprising:

a feed-forward filter for filtering the noise reference signal to produce the anti-noise signal, wherein the feed-forward filter has a first response controlled by a set of first coefficients;

a measurement subsystem for measuring a characteristic of an acoustic environment of the adaptive noise-canceling system;

a classifier for classifying the characteristic of the acoustic environment of the adaptive noise-canceling system by analyzing an output of the measurement subsystem; and a controller for providing the set of first coefficients to the feed-forward filter in conformity with an output of the classifier.

2. The adaptive noise-canceling system of claim 1, wherein the feed-forward filter is an infinite impulse response (IIR) filter.

3. The adaptive noise-canceling system of claim 1, wherein the characteristic of the acoustic environment includes a fit of a headset that generates an acoustic output including the anti-noise signal.

4. The adaptive noise-canceling system of claim 1, wherein the controller includes a look-up table for providing sets of values of the first coefficients to the feed-forward filter in conformity with an indication provided from the classifier and corresponding to a classification of the characteristic of the acoustic environment of the adaptive noise-canceling system, so that the set of first coefficients is selected from a collection of sets of coefficients.

5. The adaptive noise-canceling system of claim 4, wherein the measurement subsystem includes an adaptive filter for measuring the characteristic of the acoustic environment and providing a second response descriptive of the characteristic of the acoustic environment of the system, and wherein the classifier generates the indication from a classification applied to the second response of the adaptive filter.

6. The adaptive noise-canceling system of claim 5, wherein the adaptive noise-canceling system further comprises:

a reference input electroacoustic transducer for generating the noise reference signal according to noise present in the acoustic environment of the system;

an output electroacoustic transducer for generating an acoustic output including the anti-noise signal from a transducer input signal in the acoustic environment of the adaptive noise-canceling system; and an error input electroacoustic transducer for generating an error signal according to the acoustic output from the output electroacoustic transducer and ambient noise, and wherein the adaptive filter is responsive to the error signal to provide the second response describing the characteristic of the acoustic environment as a second response modeling a secondary acoustic path from the output of the output electroacoustic transducer to the error input electroacoustic transducer.

7. The adaptive noise-canceling system of claim 6, wherein the adaptive noise-canceling system further comprises a convergence evaluator for determining whether or not the second response provided by the adaptive filter is in a stable condition, and wherein the classifier classifies the second response of the adaptive filter in response to the convergence evaluator determining that the second response provided by the adaptive filter is in a stable condition.

8. The adaptive noise-canceling system of claim 6, wherein the classifier transforms the second response modeling the secondary acoustic path to a lower-dimensional subspace of parameters, whereby the controller generates the set of first coefficients from the parameters.

9. The adaptive noise-canceling system of claim 6, further comprising:

a source of audio information for reproduction by the output electroacoustic transducer;

a first combiner that combines the program audio with the anti-noise signal to provide the transducer input signal; and a second combiner that removes the program audio from the output of the adaptive filter to generate the error signal, whereby the classifier classifies the second coefficients of the response of the adaptive filter modeling the secondary acoustic path from the acoustic output of the output electroacoustic transducer to an output of the error input electroacoustic transducer and applies the classification to predict a required first response of the feed-forward filter.

10. The adaptive noise-canceling system of claim 9, wherein the controller, in response to detecting a change in the second coefficients compares a current classification of the second coefficients to a present response of adaptive filter, and in response to the comparison determining that the present response of the adaptive filter will not change the classification, does not update the classification and the selected set of values of the first coefficients provided to the feed-forward filter.

11. The adaptive noise-canceling system of claim 10, wherein the controller, in response to the comparison determining that the present response of the adaptive filter will change the classification, compares the present response of adaptive filter to a set of classified responses, in response to the comparison determining that a given one of the classified responses best matches the present response of the adaptive filter, updates the classification and the selected set of values of the first coefficients provided to the feed-forward filter, and wherein the controller in response to the comparison determining that none of the classified responses matches the present response of the adaptive filter, does not update the classification and the selected set of values of the first coefficients provided to the feed-forward filter.

12. The adaptive noise-canceling system of claim 6, wherein the look-up table comprises:

a first look-up table that receives coefficients of the second response descriptive of the acoustic environment of the system as a first indication as an input and provides a second indication corresponding to one of multiple type classifications for the characteristic of the acoustic environment of the system as an output; and a second look-up table that receives the second indication from the first look-up table and provides the first coefficients to the feed-forward filter in conformity with the second indication.

13. The adaptive noise-canceling system of claim 12, further comprising a residual noise evaluator that provides a third indication that indicates an effectiveness of the first response of the feed-forward filter in causing cancelation of ambient noise, wherein the second indication is further adjusted in conformity with the third indication to provide the first coefficients to the feed-forward filter.

14. The adaptive noise-canceling system of claim 13, wherein the residual noise evaluator compares an energy of the error signal to an energy of the noise reference signal to generate the third indication.

15. The adaptive noise-canceling system of claim 5, wherein the classifier applies a linear discriminant analysis to the response of the adaptive filter to generate the indication provided to the look-up table.

16. The adaptive noise-canceling system of claim 5, wherein the classifier applies a singular value discrimination analysis to the response of the adaptive filter to generate the indication provided to the look-up table.

17. The adaptive noise-canceling system of claim 1, wherein the controller further performs smoothing on the first coefficients in response to a change in the output of the classifier causing an update of the first coefficients.

18. The adaptive noise-canceling system of claim 1, wherein the feed-forward filter comprises:

a fixed first portion of the feed-forward filter for providing a fixed first partial response; and an adaptive second portion of the feed-forward filter responsive to the set of first coefficients, and wherein the fixed portion and the adaptive portion of the feed-forward filter are coupled either in series or in parallel between an input that receives the noise reference signal and an output of the adaptive noise-canceling system.

19. A method of canceling effects of ambient noise, the method comprising:

sensing the ambient noise with an acoustic sensor of an adaptive noise-canceling system to generate a noise reference signal;

generating an anti-noise signal with a feed-forward filter to reduce the presence of the ambient noise, wherein the feed-forward filter has a response controlled by a set of first coefficients;

providing the anti-noise signal to an output electroacoustic transducer;

measuring a characteristic of an acoustic environment of the adaptive noise-canceling system with a measurement subsystem;

classifying the characteristic of the acoustic environment of the adaptive noise-canceling system by analyzing an output of the measurement subsystem; and controlling a response of the feed-forward filter by selecting the set of first coefficients in conformity with an output of the classifier.

20. The method of claim 19, wherein the feed-forward filter is an infinite impulse response (IIR) filter.

21. The method of claim 19, wherein the characteristic of the acoustic environment includes a fit of a headset that generates an acoustic output including the anti-noise signal.

22. The method of claim 19, wherein the controlling provides sets of values of the first coefficients to the feed-forward filter from a look-up table in conformity with an indication generated as a result of the classifying and corresponding to a classification of the characteristic of the acoustic environment of the adaptive noise-canceling system, so that the set of first coefficients is selected from a collection of sets of coefficients.

23. The method of claim 22, wherein the measuring is performed by adaptive filter that provides a second response descriptive of the characteristic of the acoustic environment of the system, and wherein the classifying classifies the second response of the adaptive filter to generate the indication.

24. The method of claim 23, wherein the acoustic sensor is a reference input electroacoustic transducer that generates the noise reference signal according to noise present in the acoustic environment of the system, and wherein the method further comprises:

generating an acoustic output including the anti-noise signal from a transducer input signal in the acoustic environment of the adaptive noise-canceling system with the output electroacoustic transducer; and generating an error signal according to the acoustic output from the output electroacoustic transducer and ambient noise from an error input electroacoustic transducer, and wherein the adaptive filter provides the second response describing the characteristic of the acoustic environment as a second response modeling a secondary acoustic path from the output of the output electroacoustic transducer to the error input electroacoustic transducer.

25. The method of claim 24, further comprising determining whether or not the second response provided by the adaptive filter is in a stable condition, and wherein the classifying classifies the second response of the adaptive filter in response to determining that the second response provided by the adaptive filter is in a stable condition.

26. The method of claim 24, wherein the classifying transforms the second response modeling the secondary acoustic path to a lower-dimensional subspace of parameters, whereby the controlling generates the set of first coefficients from the parameters.

27. The method of claim 24, further comprising:

receiving a source of audio information for reproduction by the output electroacoustic transducer;

combining the program audio with the anti-noise signal to provide the transducer input signal; and removing the program audio from the output of the adaptive filter to generate the error signal, whereby the classifying classifies second coefficients of the response of the adaptive filter modeling the secondary acoustic path from the acoustic output of the output electroacoustic transducer to an output of the error input electroacoustic transducer and applies the classification to predict a required first response of the feed-forward filter.

28. The method of claim 27, further comprising:

in response to detecting a change in the second coefficients, first comparing a current classification of the second coefficients to a present response of adaptive filter; and in response to the first comparing determining that the present response of the adaptive filter will not change the classification, not performing an update of the classification and the selected set of values of the first coefficients provided to the feed-forward filter.

29. The method of claim 28, further comprising:

in response to the first comparing having determined that the present response of the adaptive filter will change the classification, second comparing the present response of adaptive filter to a set of classified responses;

in response to the second comparing determining that a given one of the classified responses best matches the present response of the adaptive filter, updating the classification and the selected set of values of the first coefficients provided to the feed-forward filter; and in response to the second comparing determining that none of the classified responses matches the present response of the adaptive filter, not performing an update of the classification and the selected set of values of the first coefficients provided to the feed-forward filter.

30. The method of claim 24, wherein the look-up table comprises a first look-up table that receives coefficients of the second response descriptive of the acoustic environment of the system as a first indication as an input and provides a second indication corresponding to one of multiple type classifications for the characteristic of the acoustic environment of the system as an output, and wherein the method further comprises:

receiving the second indication from the first look-up table at a second look-up table; and providing the first coefficients to the feed-forward filter from the second look-up table in conformity with the second indication.

31. The method of claim 30, further comprising:

evaluating residual noise to provide a third indication that indicates an effectiveness of the first response of the feed-forward filter in causing cancelation of ambient noise; and adjusting the second indication in conformity with the third indication to provide the first coefficients to the feed-forward filter.

32. The method of claim 31, wherein the evaluating compares an energy of the error signal to an energy of the noise reference signal to generate the third indication.

33. The method of claim 23, wherein the classifier applies a linear discriminant analysis to the response of the adaptive filter to generate the indication provided to the look-up table.

34. The method of claim 23, wherein the classifying applies a singular value discrimination analysis to the response of the adaptive filter to generate the indication provided to the look-up table.

35. The method of claim 19, wherein the controlling further comprises smoothing the first coefficients in response to a change in the output of the classifier causing an update of the first coefficients.

36. The method of claim 19, wherein the feed-forward filter comprises:

a fixed first portion of the feed-forward filter for providing a fixed first partial response; and an adaptive second portion of the feed-forward filter responsive to the set of first coefficients, and wherein the fixed portion and the adaptive portion of the feed-forward filter are coupled either in series or in parallel between an input that receives the noise reference signal and an output of the adaptive noise-canceling system.

* * * * *